United States Patent [19]

Lacombe

[11] Patent Number: 4,947,708
[45] Date of Patent: Aug. 14, 1990

[54] BICYCLE PEDAL

[75] Inventor: Jean-Pierre Lacombe, Chavanod, France

[73] Assignee: BG Innovations (Societe A Responsabilite Limitee De Droit Francais), Seynod, France

[21] Appl. No.: 381,572

[22] Filed: Jul. 18, 1989

[30] Foreign Application Priority Data

Jul. 28, 1988 [FR] France .................................. 88 10525

[51] Int. Cl.⁵ .............................................. G05G 1/14
[52] U.S. Cl. .................................. 74/594.6; 74/594.4; 36/131
[58] Field of Search ..................... 74/594.6, 594.4, 560; 36/131, 132

[56] References Cited

U.S. PATENT DOCUMENTS

| 4,488,453 | 12/1984 | Drugeon et al. | 74/594.6 |
| 4,686,867 | 8/1987 | Bernard et al. | 74/594.4 X |
| 4,762,019 | 8/1988 | Beyl | 36/131 X |
| 4,815,333 | 3/1989 | Sampson | 74/594.6 |

FOREIGN PATENT DOCUMENTS

| 0293340 | 11/1988 | European Pat. Off. | 74/594.6 |
| 3149345 | 6/1983 | Fed. Rep. of Germany | 74/594.6 |
| 3631302 | 4/1987 | Fed. Rep. of Germany | 74/594.6 |
| 3602329 | 7/1987 | Fed. Rep. of Germany | 74/594.6 |
| 2209717 | 5/1989 | United Kingdom | 36/131 |

Primary Examiner—Vinh T. Luong
Attorney, Agent, or Firm—Herbert Dubno

[57] ABSTRACT

A pedal for a bicycle has a front abutment of cylindrical configuration receiving the front edge of a plate of a shoe of the cyclist. The lever engaging the rear edge of this plate is carried by a pivot piece which can pivot in the pedal body about an axis corresponding to the frontmost generatrix of the cylindrical surface of the abutment. A retention plate holds the interfitting pivot piece end annular pedal body together.

13 Claims, 2 Drawing Sheets

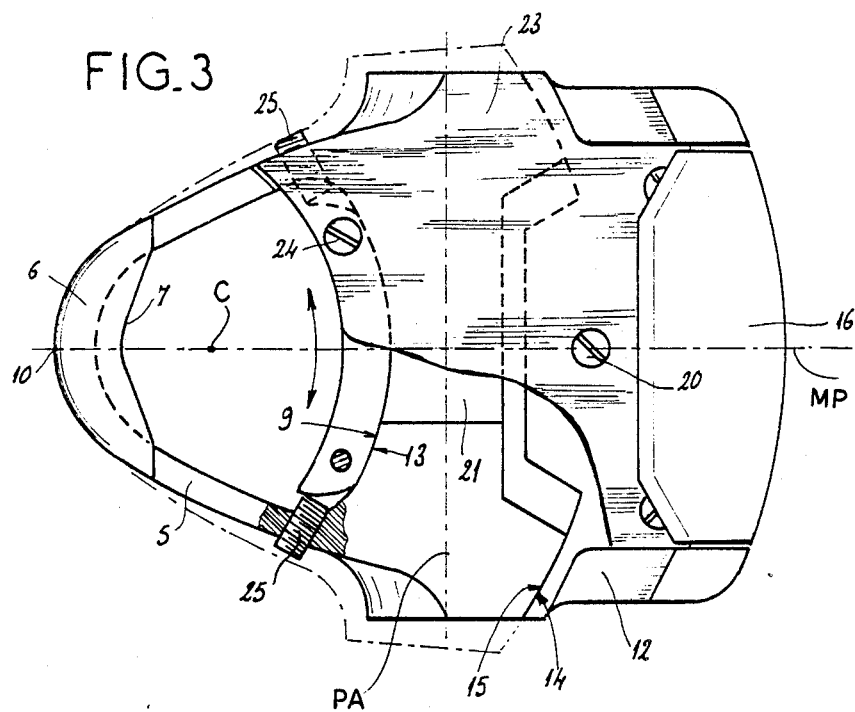

BICYCLE PEDAL

FIELD OF THE INVENTION

My present invention relates to a bicycle pedal and, more particularly, to a bicycle pedal provided with means for fixing a shoe to the pedal crank of a bicycle.

BACKGROUND OF THE INVENTION

In cycling, it is indispensable for maximum cycling advantage, for the cyclist to fix his or her feet to the pedals of the bicycle. This, of course, enables the cyclist to apply to the crank of the drive sprocket, a pedaling action not only during the descent of one of the pedals, but also during the ascent of the other pedal.

One conventional way of affixing a shoe to a pedal provides the pedal with a cage or clip which is open toward the rear and into which the cyclist inserts the toe of a shoe. The shoe is held in place by a strap which closes the cage.

This system is not entirely satisfactory since it requires some effort on the part of the cyclist to engage or disengage the foot or the shoe from the cage and manual operation of the strap. Furthermore, since the strap must be tightened, there is a constriction of the foot which interferes with the comfort of the cyclist and the performance of the cyclist. Furthermore, the cyclist cannot readily and rapidly disengage the foot from the pedal, thereby posing a danger, especially in the case of a fall.

There are pedal attachment systems in which a pedal is provided at its front end with a stop and a lever is pivotal at the rear end. The stop at the front end engages a front edge of a plate fixed on a shoe or foot and the lever engages over a rear edge of the plate. The clamping of the shoe on the pedal is effected automatically upon the application of foot pressure and the manner in which the shoe is engaged is generally similar to that which applies for automatic ski bindings.

Because the front stop has the configuration of a cylindrical surface, it is possible to release the engagement of the plate in the pedal by rotating the foot outwardly or inwardly to swing the front end of the plate free.

This has the advantage that it allows automatic engagement of the shoe in the pedal but yet permits rapid disengagement in the case of a fall by a slight movement toward the interior or exterior.

Another advantage of this system is that the foot of the cyclist is not compressed by a strap of a cage and thus the latter device for the retention of the shoe on the pedal is frequently more comfortable use.

Nevertheless, this arrangement has the drawback that each foot of the cyclist must be fixed along the axis of the pedal and that it is not possible for the foot to move angularly during pedaling. An angular displacement, of course, may release the pedal. However, some angular displaceability without such release is important because different morphologies of cyclists mandate that the foot be inclined to the axis of the pedal in one or another direction in the course of use. In some cases, an orientation of the foot at an inclination to the axis may be fixed while in other cases, for most effective pedaling action, a certain latitude of pivotal action of the foot relative to the pedal body is essential or desirable. The latter is the case especially when the cyclist is in a "dancing" position on the bicycle or where the bicycle is subjected to lateral oscillations.

OBJECTS OF THE INVENTION

It is the principal object of the present invention to provide an improved bicycle pedal which will overcome drawbacks of earlier pedal constructions.

Another object of this invention is to provide a bicycle pedal with an improved device for connecting a booth or shoe with the pedal and which permits engagement and disengagement automatically while nevertheless enabling the possibility of control of the angular position of the shoe with respect to the pedal.

SUMMARY OF THE INVENTION

These objects and others which will become apparent hereinafter are attained, in accordance with this invention by providing the pedal with a body mounted pivotally at the end of a crank arm and whose front end is provided with an abutment projected above a plane of the pedal and having the configuration of a segment of a cylindrical surface whose center is located substantially in the region of the middle of the pedal. This abutment comprises at the level of its upper edge, a ridge turned toward the rear.

The rear end of the body is equipped with a lever mounted to pivot about an axis parallel to the axis of the pedal and comprising at its upper part, a forwardly projecting beak or protuberance. This pedal is designed to cooperate with a plate fixed on the lower face of a shoe or boot and comprising front and rear extremities complementary, respectively, to the front abutment and the rear lever.

According to the invention, the front abutment is solidly connected or rigid with the body of the pedal while the fixing lever is solid or rigid with a pivot piece mounted on the body of the pedal and rotatable about an axis which is perpendicular to the plane of the pedal and located at the forwardmost generatrix forming the abutment.

More specifically, the bicycle pedal of the invention comprises:

a pedal body lying generally in a pedal plane and formed with a forward extremity having an abutment fixed to the body and engageable with a front edge of a plate on a cyclist's shoe generally complementary to the abutment, the abutment projecting upwardly from the plane and being formed with a rearwardly facing cylindrical segment having at an upper edge, a rearwardly projecting ledge adapted to overhang the plate, the cylindrical segment having an axis located generally toward a center of the body;

means at a rear end of the body for pivotally connecting the pedal body to an end of a crank arm of a bicycle whereby the pedal can pivot about a pedal axis relative to the crank arm;

a pivot piece engaged with the body and pivotal relative to the body about a pivot axis perpendicular to the plane and disposed substantially at a forwardmost generatrix of the cylindrical segment; and a lever pivotally mounted on the pivot piece for swinging movement about a lever axis parallel to the pedal axis at a rear end of the pedal and having an upper portion formed with a forwardly projecting protuberance engageable over a rear edge of the plate generally complementary to the lever.

It is thus possible with the pedal of the invention for the user to pivot his or her foot with respect to the abutment which therefore plays the role of an articulation point, without disengaging the front edge of the plate from this abutment and releasing the shoe from the pedal.

According to a feature of the invention the body of the pedal is constituted by a member of annular configuration whose front end is formed unitarily with the abutment and whose rear end is provided with bar serving to receive the pivot shaft of the crank arm. The bar may form a stage at which the ball of the foot may be located.

This rear part has a forwardly turned face which is constituted by a segment of a cylindrical surface whose axis is perpendicular to the plane of the pedal and is disposed in the region of the foremost generatrix of the abutment while the pivot piece carrying the lever comprises a recess receiving the bar or a projection or surface contacting the forwardly turned surface which is formed with a cylindrical surface complementary to the forwardly turned surface of the body.

A cover or retention plate is secured to the upper surface of the pivot piece carrying the lever to cover part of the upper surface of the pedal body as well and retain the pivot piece on the latter.

According to the invention, the pivot piece is interfitted with the pedal body and held in place thereon by the retention plate while nevertheless permitting a relative movement between them.

According to another feature of the invention auxiliary means is provided for rotatably guiding the pivot piece on the pedal body, this means comprising complementary cylindrical surfaces on the rearmost end of the body and on a wall juxtaposed therewith of the pivot piece.

Advantageously, the pedal body is formed from a light metal alloy, e.g. a titanium aluminum or magnesium alloy, while the pivot piece is formed of a hard synthetic resin material such as that marketed under the name DELRIN. The retention plate is preferably composed of stainless steel.

This choice of material has been found to be particularly important because it ensures a sliding of the pivot piece on the pedal body with a minimum of friction. To further limit such friction, a plate, foil, sheet or other layer of a synthetic material having a high coefficient of sliding or low coefficient of sliding friction, e.g. polytetrafluoroethylene, is interposed between the upper face of the pedal body forming the level on which the pivot body slides, and the cover or retention plate.

Preferably, means is provided for regulating or controlling the angular displacement of the pivot piece relative to the pedal body and/or for blocking such angular displacement after an angular adjustment of the pivot piece.

This latter means can include two screws engaged in two threaded bores formed in the body on opposite sides and juxtaposed with the ends of the front branch of the pivot piece. By varying the extent to which these screws are threaded into the bores it is possible to block the pivot piece in a selected angular position or to allow a certain play between the pivot piece and the end of the screws to permit some latitude in pivoting during pedaling.

BRIEF DESCRIPTION OF THE DRAWING

The above and other objects, features and advantages of my invention will become more readily apparent from the following description, reference being made to the accompanying highly diagrammatic drawing in which:

FIG. 3 is a plan view of the pedal, partly broken away, and diagrammatically showing pivotal action of the pedal body, assuming the pivot piece to be stationary, to either side of a longitudinal median plane through the pedal.

DESCRIPTION OF THE PREFERRED EMBODIMENT

Figure 1:
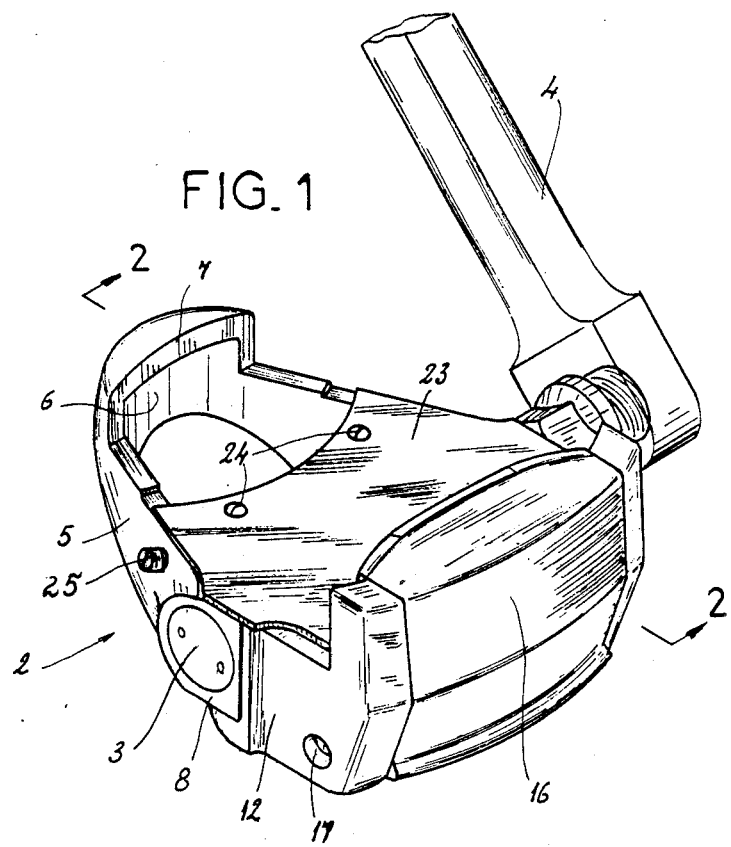
FIG. 1 is a perspective view of a pedal provided with the device the invention.
Figure 2:
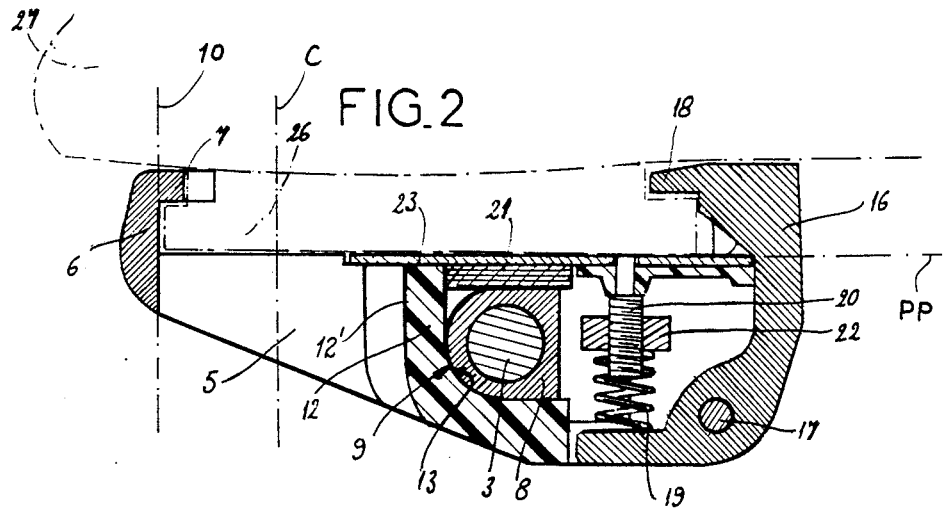
FIG. 2 is a longitudinal section taken along the line 2—2 of FIG. 1.

FIG. 1 shows a pedal 2 which is mounted by a pivot shaft 3 on the end of a crank arm 4 of the drive sprocket of a bicycle. The shaft 3 defines a pedal axis which extends perpendicularly to the crank arm 4 and has been represented at PA in FIG. 3. The longitudinal median plane of the pedal is represented at MP in this figure and a pedal plane is represented at PP in FIG. 2.

The pedal 2 comprises pedal body 5 lying generally in the pedal plane PP and composed of a light alloy and having an annular configuration which is somewhat triangular as seen from above and generally symmetrical with respect to the longitudinal median plane MP which is perpendicular to the pedal plane PP and to the pedal axis PA.

The front extremity of the body 2 comprises an abutment 6 in the form of a cylindrical surface segment whose axis is located approximately at the center C of the pedal and is perpendicular to the pedal plane PP. The upper edge of this abutment is formed with an inwardly turned ledge 7 directed rearwardly and adapted to overhang a plate 26 affixed at the bottom of the shoe 27 at approximately the ball of the foot.

The rear part 8 of the pedal body 5 is a bar which serves for mounting of the shaft 3 and comprises a forwardly directed face 9 in the form of a cylindrical surface segment (see FIG. 3) centered on an axis which coincides with a generatrix 10 of the cylindrical surface of the abutment 6 located most forwardly.

The pedal also comprises a pivot piece 12 formed from a synthetic material such as that marketed under the trademark DELRIN and having an upper projection 12' formed with a recess turned rearwardly and permitting interfitting with the rear branch 8 of the body 5 when this piece is inserted from the bottom upwardly into the latter. The projection 12' delimiting the recess is formed at its front side with a face 13 also of cylindrical segmental form complementary to that of the surface 9.

The cooperation between the surfaces 9 and 13 allows relative partial rotation or pivoting action of members 5 and 12 relative to one another because of their cylindrical surfaces having as the common axis the generatrix 10.

The rotational guidance of the two parts relative to one another is also facilitated by the auxiliary cylindrical guide surfaces 14 and 15 centered on the same axis and formed, respectively on a rear part of the body 5 and on a face of the pivot piece 12 juxtaposed therewith.

The posterior extremity of the pivot piece 12 is equipped with a lever 16 mounted to pivot about an axis 17 referred to herein as the lever axis, parallel to the pedal axis PA. The lever has an upper end carrying a protuberance 18 turned forwardly and engageable over the rear edge of the plate 26.

The lever 16 is normally maintained in a position tilted forwardly as shown in the drawing, by the action of two springs 19 whose compression forces are controlled by a screw 20 bearing against a strap 22 acting upon these springs.

After interfitting of the pivot piece 12 in the body 5, the two elements are held together by a plate 23 of stainless steel, fixed by a screw 24 on the pivot piece 12 and covering part of the body 5 without interfering with the pivotal movement of the pivot piece 12 with respect to the body 5. This pivotal movement is promoted by interposing between the part of the body 5 in which the shaft 3 is received and the plate 23, a layer, sheet or plate 21 of a synthetic material having a high sliding coefficient or low coefficient of sliding friction.

Thus the pivot piece 12 together with the lever can pivot relative to the body 5 about the axis 10 without any interference with the pivotability of the shoe relative to the abutment 6 to release that shoe in the usual manner.

As can be seen from FIG. 3, this pivotal movement can be limited by two screws 25 engaged in the body 5 on one side and the other in respective threaded bores. These screws can engage opposite ends of the front branch of the pivot piece 12 to hold the latter in a predetermined position or to allow some angular play about the axis 10 between the limits defined by the screws. The extreme positions to one side and the other are shown in dot-dash lines in FIG. 3 where, for convenience of illustration, the pivot piece 12 remains centered on the median plane MP while the body 5 has been represented as being swung to one side or the other.

In practice, the device of the invention is used in the same manner as the conventional device. The cyclist inserts the front edge of the plate 26 in the front abutment and presses downwardly to snap the lever 16 over the rear edge of the plate. The screw is released by twisting the foot to swing the front end out of the abutment.

The invention, therefore, not only provides the advantages of a device for attaching the pedal to the shoe and the safety afforded by quick release, but also allows adjustment or control of the angular position of the shoe with respect to the pedal.

I claim:
1. A bicycle pedal, comprising:
 a pedal body lying generally in a pedal plane and formed with a forward extremity having an abutment fixed to said body and engageable with a front edge of a plate on a cyclist's shoe generally complementary to said abutment, said abutment projecting upwardly from said plane and being formed with a rearwardly facing arcuate segment having at an upper edge, a rearwardly projecting ledge adapted to overhang said plate, said rearwardly facing arcuate segment having an axis located generally toward a center of said body;
 means at a rear end of said body for pivotally connecting said pedal body to an end of a crank arm of a bicycle whereby said pedal can pivot about a pedal axis relative to said crank arm;
 a pivot piece engaged with said body and pivotal relative to said body about a pivot axis perpendicular to said plane and disposed substantially at a forwardmost generatrix of said rearwardly facing arcuate segment; and
 a lever pivotally mounted on said pivot piece for swinging movement about a lever axis parallel to said pedal axis at a rear end of the pedal and having an upper portion formed with a forwardly projecting protuberance engageable over a rear edge of said plate generally complementary to said lever, said body forming an opening and being formed unitarily at its forward end with said abutment and said means at said rear end of said body for pivotally connecting said pedal body to an end of said crank arm of said bicycle is a bar receiving a pivot shaft defining said pedal axis, said bar being formed with a forwardly facing surface constituted by a forwardly facing arcuate segment centered on an axis thereof coinciding with said generatrix and said pivot axis and perpendicular to said plane, said pivot piece comprising an upwardly turned projection interfitting with said body and delimited forwardly by a branch having a posterior surface in the form of another arcuate segment complementary to said forwardly facing surface and sliding therealong.

2. The pedal defined in claim 1, further comprising a retaining plate affixed to an upper surface of said pivot piece and covering at least part of an upper surface of said body for securing said pivot piece on said body while permitting relative pivotal displacement of said pivot piece and said body about said pivot axis.

3. The pedal defined in claim 2, further comprising auxiliary guide means between said body and said pivot piece for enabling relative pivotal displacement of said pivot piece and said body about said pivot axis.

4. The pedal defined in claim 3 wherein said auxiliary guide means includes complementary arcuate surfaces centered on said generatrix and respectively provided on a rearmost portion of said body and on a wall of said pivot piece facing said rearmost portion of said body.

5. The pedal defined in claim 4 wherein said body is fabricated from a metal alloy, said pivot piece is fabricated from a synthetic resin material and said retaining plate is composed of stainless steel.

6. The pedal defined in claim 2, further comprising a layer of low coefficient of sliding friction interposed between said retaining plate and an upper surface of said body.

7. The pedal defined in claim 2, further comprising means for regulating angular displacement of said pivot piece relative to said body.

8. The pedal defined in claim 2, further comprising means for limiting angular displacement of said pivot piece relative to said body.

9. The pedal defined in claim 8 wherein said means for limiting angular displacement of said pivot piece relative to said body includes two screws adjustably threaded into opposite sides of said body and engageable with opposite ends of said branch of said pivot piece.

10. The pedal defined in claim 9, further comprising auxiliary guide means between said body and said pivot piece for enabling relative pivotal displacement of said pivot piece and said body about said pivot axis.

11. The pedal defined in claim 10 wherein said auxiliary guide means includes complementary arcuate surfaces centered on said generatrix and respectively provided on a rearmost portion of said body and on a wall of said pivot piece facing said rearmost portion of said body.

12. The pedal defined in claim 11 wherein said body is fabricated from a metal alloy, said pivot piece is fabricated from a synthetic resin material and said retaining plate is composed of stainless steel.

13. The pedal defined in claim 14, further comprising a layer of low coefficient of sliding friction interposed between said retaining plate and an upper surface of said body.

* * * * *